United States Patent
Shiraki

(10) Patent No.: US 6,675,742 B1
(45) Date of Patent: Jan. 13, 2004

(54) ADJUSTABLE LOOP LEASH CONSTRUCTION

(76) Inventor: Yoshitsune Shiraki, 176 W. 94th St., Apt. 7A, New York, NY (US) 10025

( * ) Notice: Subject to any disclaimer, the term of this patent is extended or adjusted under 35 U.S.C. 154(b) by 0 days.

(21) Appl. No.: 09/624,612

(22) Filed: Jul. 24, 2000

(51) Int. Cl.7 ............................................... A01K 27/00
(52) U.S. Cl. ...................... 119/797; 119/795; 119/798; 119/793
(58) Field of Search ................ 119/795, 797, 119/798, 799, 793; D30/153, 152

(56) References Cited

U.S. PATENT DOCUMENTS

| | | | |
|---|---|---|---|
| 2,861,547 A | 11/1958 | Dale | 119/109 |
| 3,752,127 A | 8/1973 | Baker | 119/109 |
| 4,763,609 A | 8/1988 | Kulik | 119/109 |
| 5,551,380 A * | 9/1996 | Hodgson | 119/795 |
| D379,688 S * | 6/1997 | Werner | D30/152 |
| D382,379 S * | 8/1997 | Smith | D30/153 |
| 5,709,172 A | 1/1998 | Maglich | 119/797 |
| 5,915,336 A | 6/1999 | Watson | 119/797 |
| 6,029,611 A * | 2/2000 | Hershauer | 119/771 |
| D431,885 S * | 10/2000 | Gellenbeck | D30/153 |

* cited by examiner

*Primary Examiner*—Robert P. Swiatek
*Assistant Examiner*—Judith A. Nelson
(74) *Attorney, Agent, or Firm*—Sturm & Fix LLP

(57) ABSTRACT

An adjustable loop leash construction (10) for use with a pet collar (70) having an attachment ring (71). The construction (10) includes a one piece elongated leash member (11) having looped openings (25) formed on the opposite ends (22), (23) of the leash member (11). The looped openings (25) are dimensioned to encircle the ring portions (30) of a pair of snap ring swivel members (12). The leash member (11) is further provided with a plurality of grommet members (13) that are spaced along the length of the leash member (11) and adapted to be engaged by the snap portion (32) of either of the snap ring swivel members (12).

9 Claims, 2 Drawing Sheets

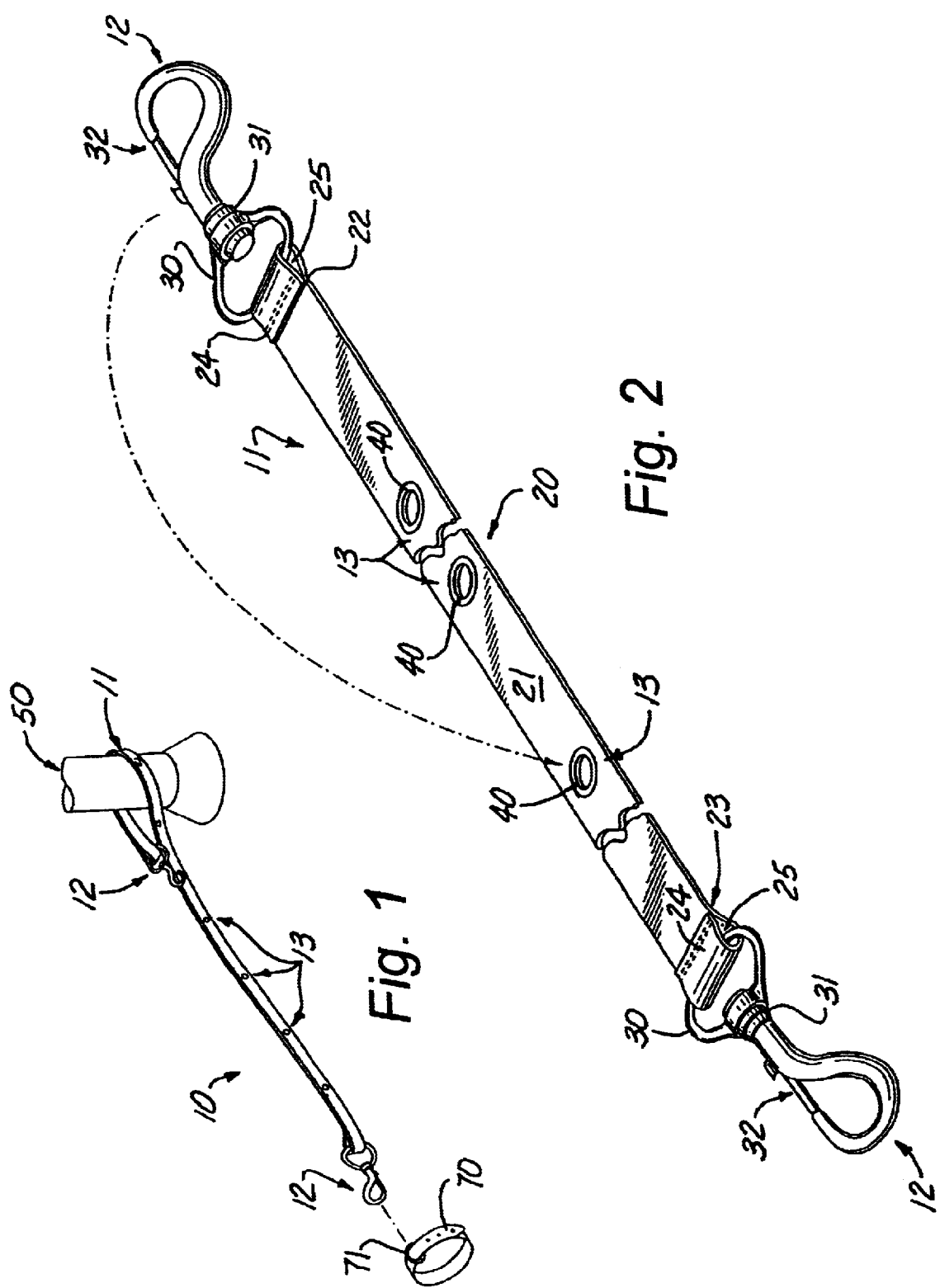

ADJUSTABLE LOOP LEASH CONSTRUCTION

BACKGROUND OF THE INVENTION

1. Field of the Invention

The present invention relates to the field of animal leashes in general, and in particular to a leash having an adjustable length handle loop.

2. Description of Related Art

As can be seen by reference to the following U.S. Pat. Nos. 2,861,547; 3,752,127; 4,763,609; 5,709,172; and 5,915,336, the prior art is replete with myriad and diverse adjustable loop leash construction.

While all of the aforementioned prior art constructions are more than adequate for the basic purpose and function for which they have been specifically designed, they are uniformly deficient with respect to their failure to provide a simple, efficient, and practical adjustable loop leash construction which is simple and inexpensive to manufacture and which employs the least number of structural components to function in the exact same manner as the more structurally complicated prior art constructions.

While all adjustable loop leash constructions function in the same basic manner, their ultimate cost to the consumer is normally predicated on the number of structural components involved, the time required to manufacture the individual components, as well as the time involved in assembling the components into the finished adjustable loop leash constructions.

As a consequence of the foregoing situation, there has existed a longstanding need among pet owners for a new and improved adjustable loop leash construction that can be purchased at a fraction of the cost of the more structurally complex adjustable loop leash constructions while providing all of the benefits thereof, and the provision of such a construction is the stated objective of the present invention.

BRIEF SUMMARY OF THE INVENTION

Briefly stated, the adjustable loop leash construction that forms the basis of the present invention comprises in general, a leash member, a pair of snap swivel members, and a plurality of enlarged grommet members.

As will be explained in greater detail further on in the specification, the leash member comprises an elongated one piece strap element fabricated from a single strip of material, preferably fabricated from leather or nylon cloth. The opposite ends of the strap element are formed into closed loops adapted to engage the ring portions of the pair of snap ring swivel members.

In addition, the plurality of grommet members are aligned along the longitudinal axis of the strap element and spaced from the sides thereof. Each of the snap ring swivel members can selectively engage one of the plurality of grommet members to form an adjustable length loop on either end of the leash member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the adjustable loop leash construction employed in one mode of use;

FIG. 2 is an isolated perspective view of the leash construction; and

DETAILED DESCRIPTION OF THE INVENTION

Figure 3:
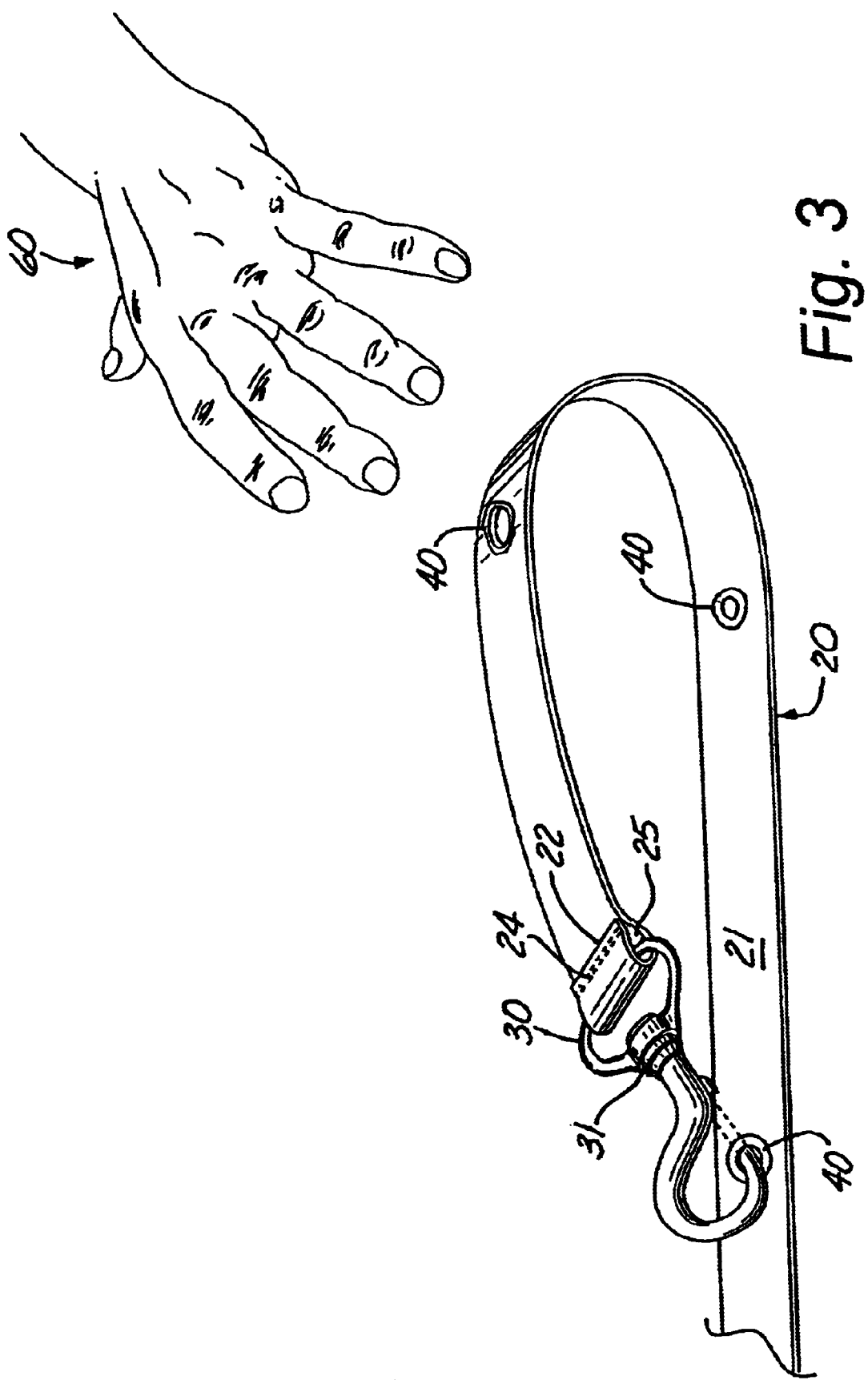
FIG. 3 is an enlarged perspective view of the handle portion of the leash construction.

As can be seen by reference to the drawings, and in particular to FIG. 1, the adjustable loop leash construction that forms the basis of the present invention is designated generally by the reference number 10. The construction 10 comprises the following structural components: an elongated one piece leash member 11, a pair of snap ring swivel members 12, and a plurality of enlarged grommet member 13. These structural components will now be described in seriatim fashion.

As can best be seen by reference to FIG. 2, the leash member 11 comprises an elongated strap element 20 fabricated from a strip of material 21, such as leather or nylon cloth and having opposite ends 22, 23 which are folded back upon themselves and secured as by stitching 24 or the like to form discrete looped openings 25 whose purpose and function will be described presently.

Still referring to FIG. 2, it can be seen that each of the pair of snap ring swivel members 12 are of conventional construction and include a ring portion 30, a swivel portion 31, and a snap portion 32. The inboard ends of the ring portion 30 are captively engaged within the looped openings formed on the opposite ends 22, 23 of the leash member 11.

As can best be seen by reference to FIGS. 1 and 2, the plurality of grommet members 13 comprise enlarged conventional metal grommet elements 40 which are disposed at spaced locations along the entire longitudinal axis of the leash member 11 and dimensioned such that the outer periphery of each grommet element 40 is spaced from the sides of the strap element 20 of the leash member 11.

As can be appreciated by reference to FIGS. 1 through 3, each of the grommet elements 40 are dimensioned to receive the snap portion 32 of the pair of snap ring swivel members 12 such that either end of the leash construction 10 can be formed into an adjustable length handle loop that can be enlarged to captively engage a stationary object 50 or reduced to accommodate a pet owner's hand 60 while remaining snap ring swivel member 13 can engage the D-ring 71 on a dog collar 70 or the like.

By now it should be appreciated that the total number of structural components that are employed in the leash construction 10 that forms the basis of this invention include a single one piece leash member 11, a pair of snap ring swivel members 12, plus the exact number (N) of the plurality of grommet members 13 for a total of (3+N) components.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An adjustable loop leash construction for use with a pet collar having an attachment ring wherein the leash construction consists of:
   a one piece leash member including an elongated strap element having opposite ends which form discrete looped openings;
   a pair of snap ring swivel members each having a snap portion, a swivel position, and a ring portion wherein each ring portion is captively engaged on one of the looped openings on the opposite ends of the elongated strap element; and,
   means for captively receiving the snap portion of both snap ring swivel members at equally spaced locations along the entire longitudinal axis of the elongated strap.

2. The construction as in claim 1 wherein the elongated strap element is fabricated from an elongated strip of material.

3. The construction as in claim 2 wherein the elongated strip of material is selected from among leather and nylon cloth.

4. The construction as in claim 1 wherein said means for captively receiving the snap portion of both snap ring swivel members comprises:
   a plurality of grommet members disposed at spaced locations along the longitudinal axis of the elongated strap element.

5. The construction as in claim 4 wherein each of the grommet members comprises an enlarged grommet element whose sides are spaced from the opposite sides of the elongated strap element.

6. An adjustable loop leash construction for use with a pet collar having an attachment ring wherein the leash construction comprises:
   a one piece leash member including an elongated strap element having opposite ends which form discrete looped openings;
   a pair of snap ring swivel members each having a snap portion, a swivel portion, and a ring portion wherein each ring portion is captively engaged in one of the looped openings on the opposite ends of the elongated strap element; and,
   a plurality of grommet members disposed at equally spaced locations along the entire longitudinal axis of the elongated strap element.

7. The construction as in claim 6 wherein each of the grommet members comprises an enlarged grommet element whose sides are spaced from the opposite sides of the elongated strap element.

8. The construction as in claim 7 wherein the elongated strap element is fabricated from an elongated strip of material.

9. The construction as in claim 8 wherein the elongated strip of material is selected from among leather and nylon cloth.

* * * * *